(12) United States Patent
Robb et al.

(10) Patent No.: US 8,097,375 B2
(45) Date of Patent: Jan. 17, 2012

(54) PROCEDURE FOR FILLING A FUEL CELL ANODE SUPPLY MANIFOLD WITH HYDROGEN FOR START-UP

(75) Inventors: Gary M. Robb, Honeoye Falls, NY (US); Steven G. Goebel, Victor, NY (US); Wenbin Gu, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 306 days.

(21) Appl. No.: 12/014,326

(22) Filed: Jan. 15, 2008

(65) Prior Publication Data

US 2009/0181268 A1    Jul. 16, 2009

(51) Int. Cl.
*H01M 8/24* (2006.01)
(52) U.S. Cl. ........ 429/443; 429/428; 429/429; 429/446; 429/455
(58) Field of Classification Search ............ 429/428, 429/429, 443
See application file for complete search history.

(56) References Cited

U.S. PATENT DOCUMENTS

| 6,537,692 B1 * | 3/2003 | Horiguchi et al. ............ 429/413 |
| 2005/0129999 A1 * | 6/2005 | Geschwindt et al. ........... 429/22 |
| 2008/0020245 A1 * | 1/2008 | Milacic et al. .................. 429/12 |
| 2008/0152972 A1 * | 6/2008 | Igarashi et al. ................. 429/22 |

* cited by examiner

*Primary Examiner* — Patrick Ryan
*Assistant Examiner* — Ladan Mohaddes
(74) *Attorney, Agent, or Firm* — Fraser Clemens; Martin & Miller LLC; J. Douglas Miller (57) ABSTRACT

A method for filling a fuel cell anode supply manifold with hydrogen prior to a start-up operation to facilitate a substantially even hydrogen distribution across the fuel cell is disclosed. The anode supply manifold is in fluid communication with a source of hydrogen. A first valve in fluid communication with the anode supply manifold and a second valve in fluid communication with an anode exhaust manifold are initially in a closed position while hydrogen is supplied to the anode inlet conduit to pressurize the fuel cell stack. The first valve is then opened to purge at least a portion of a fluid from the anode supply manifold to facilitate a filling of the manifold with hydrogen.

15 Claims, 5 Drawing Sheets

PROCEDURE FOR FILLING A FUEL CELL ANODE SUPPLY MANIFOLD WITH HYDROGEN FOR START-UP

FIELD OF THE INVENTION

This invention relates to a method of operation for a fuel cell system. More particularly, the invention is directed to a method for filling an anode supply manifold with hydrogen prior to a start-up operation of the fuel cell system to facilitate even hydrogen distribution across inlets of individual fuel cells.

BACKGROUND OF THE INVENTION

Fuel cell systems convert a fuel and an oxidant to electricity in a fuel cell stack. One type of fuel cell system employs a proton exchange membrane (hereinafter "PEM"). The PEM is a solid polymer electrolyte membrane that facilitates transfer of protons from an anode to a cathode in each individual fuel cell normally deployed in a fuel cell system. The electrodes and membrane together form a membrane electrode assembly (MEA). The electrodes contain catalysts to catalytically facilitate reaction of the fuel (such as hydrogen) and the oxidant (such as oxygen or air) to generate the electricity.

In a typical PEM fuel cell, the MEA is disposed between gas diffusion media (GDM). The GDM and MEA are disposed between a pair of electrically conductive plates. If the plates are bipolar plates, the plates conduct current between adjacent fuel cells in the fuel cell system. If the plates are unipolar plates at an end of the fuel cell system, the plates conduct current externally of the fuel cells.

As described in applicant's co-pending U.S. patent application Ser. No. 11/762,845, hereby incorporated herein by reference in its entirety, the goal of an anode supply manifold purge operation is to completely fill the anode supply manifold with hydrogen prior to filling active areas of the anode with hydrogen during startup. Generally, the anode supply manifold is filled with hydrogen by opening a manifold purge valve at the top of the anode supply manifold while producing a flow of hydrogen into the bottom of the anode supply manifold.

A flow rate of hydrogen, along with a flow resistance of the purge valve, creates a back pressure in the anode supply. As the back pressure increases in the anode supply manifold, hydrogen in the bottom of the supply manifold is caused to flow into the active areas of fuel cell plates at the bottom of a fuel cell stack. As the hydrogen flows into the active areas of the fuel cell plates, a localized voltage rise may be measured. The voltage rise generates a current that is driven through the remaining fuel cell plates of the fuel cell stack. Fuel cells of the fuel cell stack which do not have a sufficient amount of hydrogen to support the current will experience a localized reversed current, thereby resulting in electrode carbon corrosion. Additionally, fuel cells without a sufficient amount of hydrogen are in a hydrogen deficit. To overcome the hydrogen deficit, additional hydrogen must be caused to flow into the fuel cell stack, thereby increasing a start-up time of the fuel cell system.

It would be desirable to develop a method for filling an anode supply manifold of a fuel cell system with hydrogen prior to a start-up operation, wherein the anode supply manifold is substantially evenly filled with hydrogen and unevenly filling an active area of fuel cells of the fuel cell stack with hydrogen is militated against.

SUMMARY OF THE INVENTION

Concordant and consistent the present method, a method for filling an anode supply manifold of a fuel cell system with hydrogen prior to a start-up operation, wherein the anode supply manifold is substantially evenly filled with hydrogen and unevenly filling an active area of fuel cells of the fuel cell stack with hydrogen is militated against, has surprisingly been discovered.

In one embodiment, a method for filling a fuel cell anode supply manifold with hydrogen gas during start-up comprises the steps of providing a fuel cell stack having a plurality of fuels cells, the fuel cell stack including an anode supply manifold and an anode exhaust manifold, the anode supply manifold having a fluid disposed therein and in fluid communication with a source of hydrogen gas; providing a first valve in fluid communication with the anode supply manifold; providing a second valve in fluid communication with the anode exhaust manifold; supplying hydrogen to the anode supply manifold with the first valve and the second valve in the closed position to pressurize the fuel cell stack to a desired pressure; and opening the first valve to facilitate a purging of at least a portion of the fluid from the anode supply manifold to facilitate a filling of the manifold with hydrogen.

In another embodiment, a method for filling a fuel cell anode supply manifold with hydrogen gas during start-up comprises the steps of providing a fuel cell stack having a plurality of fuels cells, the fuel cell stack including an anode supply manifold and an anode exhaust manifold, the anode supply manifold having a fluid disposed therein and in fluid communication with a source of hydrogen gas; providing an anode exhaust manifold in fluid communication with anodes of the fuel cells and an exhaust system providing a first valve in fluid communication with the anode supply manifold; providing a second valve in fluid communication with the anode exhaust manifold; providing a chamber between an outlet of the anode supply manifold and the first valve; providing a chamber between an outlet of the anode exhaust manifold and the second valve; supplying hydrogen to the anode supply manifold with the first valve and the second valve in the closed position to pressurize the fuel cell stack to a desired pressure; opening the first valve to facilitate a purging of at least a portion of the fluid from the anode supply manifold to facilitate a filling of the manifold with hydrogen; and closing the first valve and opening the second valve to cause the hydrogen to flow into the active areas of the fuel cells at a substantially equal rate.

In another embodiment a fuel cell system comprises a fuel cell stack having a plurality of fuel cells, each of the fuel cells including an electrolyte membrane disposed between an anode and a cathode; an anode supply manifold in fluid communication with the anodes of the fuel cells; an anode inlet conduit in fluid communication with the anode supply manifold, the anode inlet conduit providing fluid communication between a hydrogen source and the anode supply manifold; an anode exhaust manifold in fluid communication with the anodes of the fuel cells and an exhaust system; a first valve in fluid communication with the anode supply manifold; a second valve in fluid communication with the anode exhaust manifold; at least one chamber disposed between at least one of the anode supply manifold and the first valve and the anode exhaust manifold and the second valve

BRIEF DESCRIPTION OF THE DRAWINGS

The above, as well as other advantages of the present disclosure, will become readily apparent to those skilled in the art from the following detailed description, particularly when considered in the light of the drawings described hereafter.

DETAILED DESCRIPTION OF THE EMBODIMENTS OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

Figure 1:
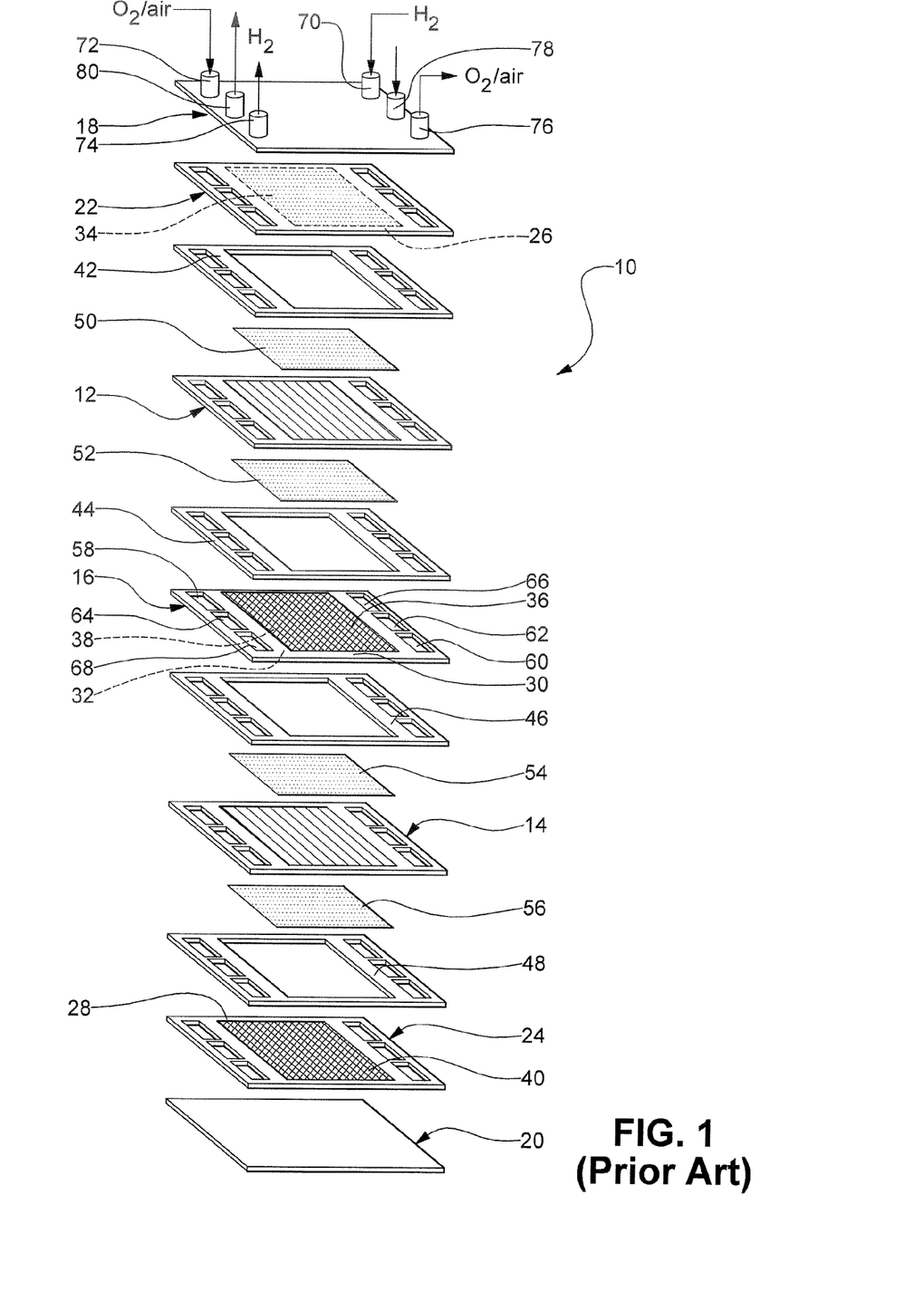
FIG. 1 is a schematic exploded perspective view of a PEM fuel cell stack as known in the art.

FIG. 1 illustrates a PEM fuel cell stack 10 according to the prior art. The fuel cell stack 10 includes a pair of membrane electrode assemblies (MEAs) 12, 14 separated by an electrically conductive bipolar plate 16. The MEAs 12, 14 and the bipolar plate 16 are stacked between a pair of clamping plates 18, 20 and a pair of unipolar end plates 22, 24. The clamping plates 18, 20 are electrically insulated from the end plates 22, 24 by a gasket or a dielectric coating (not shown). A working face 26, 28 of each of the unipolar end plates 22, 24, as well as the working faces 30, 32 of the bipolar plate 16, include a plurality of grooves or channels 34, 36, 38, 40 adapted to facilitate the flow of a fuel such as hydrogen and an oxidant such as oxygen therethrough. Nonconductive gaskets 42, 44, 46, 48 provide seals and an electrical insulation between the components of the fuel cell stack 10. Gas-permeable diffusion media 50, 52, 54, 56 such as carbon or graphite diffusion papers substantially abut each of an anode face and a cathode face of the MEAs 12, 14. The end plates 22, 24 are disposed adjacent the diffusion media 50, 56 respectively. The bipolar plate 16 is disposed adjacent to the diffusion media 52 on the anode face of the MEA 12. The bipolar plate 16 is further disposed adjacent the diffusion media 54 on the cathode face of the MEA 14.

The fuel cell stack 10 further includes a cathode supply manifold 58 and a cathode exhaust manifold 60, a coolant supply manifold 62, a coolant exhaust manifold 64, an anode supply manifold 66, and an anode exhaust manifold 68. The supply manifolds 58, 62, 66 and the exhaust manifolds 60, 64, 68 are formed by alignment of adjacent apertures formed in the bipolar plate 16, apertures formed in the gaskets 42, 44, 46, 48, and apertures formed in the end plates 22, 24. A hydrogen gas is supplied to the fuel cell stack 10 through the anode supply manifold 66 via an anode inlet conduit 70. An oxidant gas is supplied to the fuel cell stack 10 through the cathode supply manifold 58 of the fuel cell stack 10 via a cathode inlet conduit 72. An anode outlet conduit 74 and a cathode outlet conduit 76 are provided for the anode exhaust manifold 68 and the cathode exhaust manifold 60, respectively. A coolant inlet conduit 78 and a coolant outlet conduit 80 are in fluid communication with the coolant supply manifold 62 and the coolant exhaust manifold 64 to provide a flow of a liquid coolant there through. It is understood that the configurations of the various inlets 70, 72, 78 and outlets 74, 76, 80 in FIGS. 1 and 2 are for the purpose of illustration, and other configurations may be chosen as desired.

Figure 2:
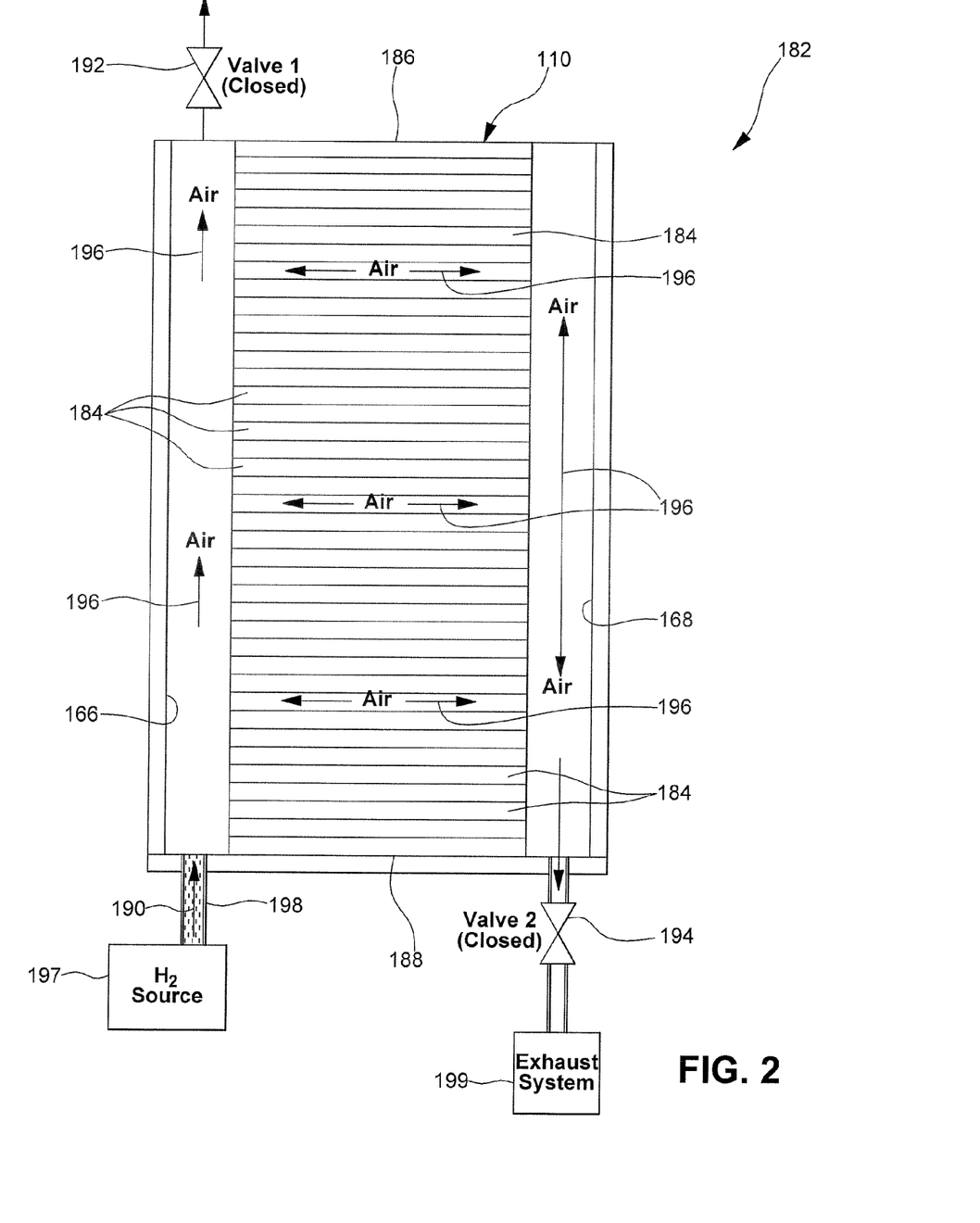
FIG. 2 is a schematic cross-sectional view of a fuel cell stack during a filling operation of an anode supply manifold of the fuel cell stack according to an embodiment of the present invention.
Figure 3:
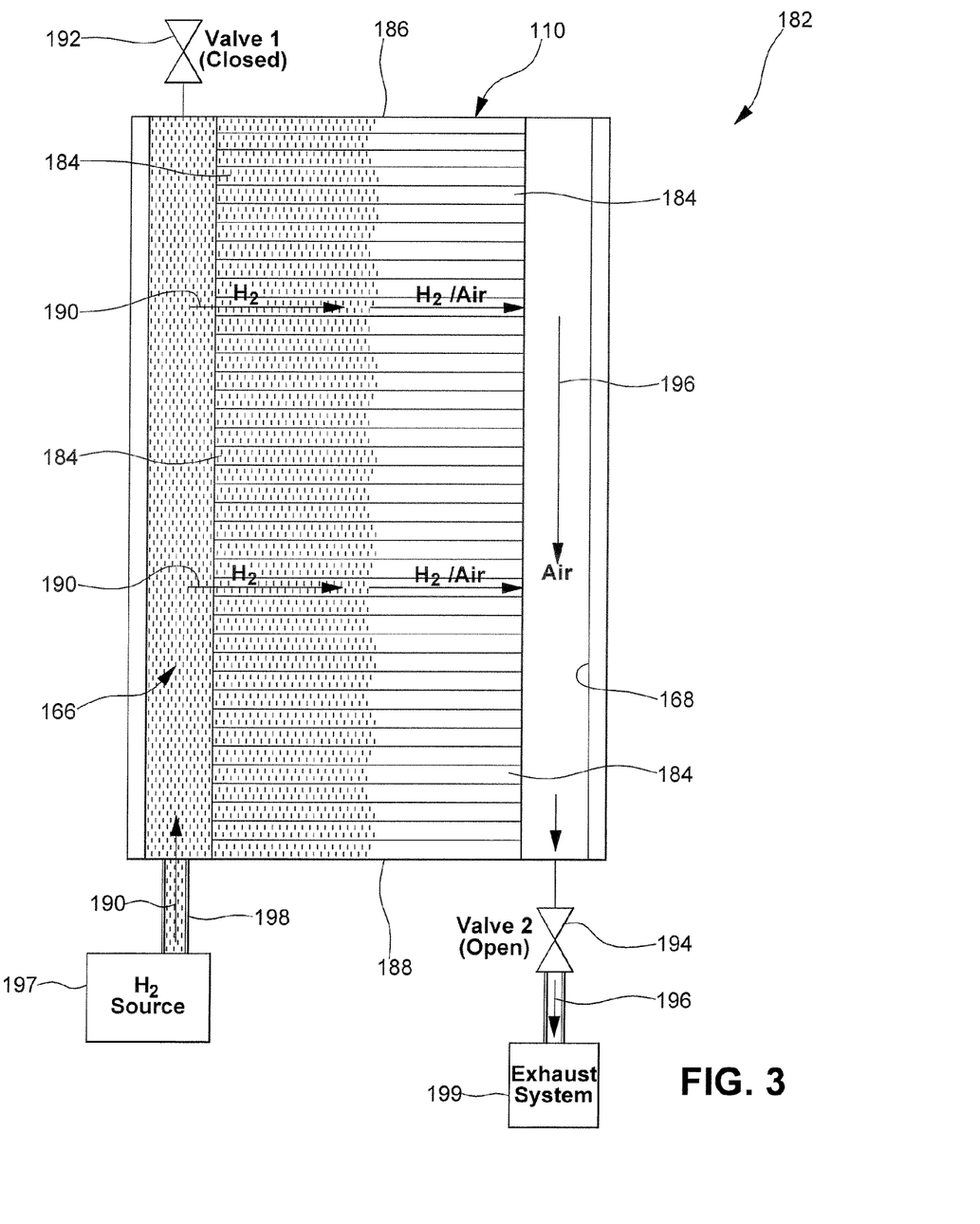
FIG. 3 is a schematic cross-sectional view of the fuel cell stack of FIG. 2 after the anode supply manifold filling operation.

FIGS. 2 and 3 show a fuel cell system 182 according to an embodiment of the invention. The fuel cell system 182 includes a fuel cell stack 110 having a plurality of fuel cells 184. Each of the fuel cells 184 has an anode (not shown) and a cathode (not shown) with an electrolyte membrane (not shown) disposed therebetween. The fuel cell stack 110 further includes a first end 186 and a second end 188. As described herein, the first end 186 is known as the "dry end" and the second end 188 is known as the "wet end."

An anode supply manifold 166 is in communication with the anodes of the fuel cells 184 and provides fluid communication between a source of hydrogen 197 and the fuel cells 184. The anode supply manifold 166 is adapted to receive a flow of gaseous hydrogen 190 through an anode inlet conduit 198 from the source of hydrogen 197. The anode inlet conduit 198 defines a volume between the source of hydrogen 197 and the anode supply manifold 166. It is understood that the anode inlet conduit 198 may have any desired cross-sectional area and may further include a chamber, for example. An anode exhaust manifold 168 of the fuel cell system 182 provides fluid communication between the anodes of the plurality of fuel cells 184 and an exhaust system 199. The anode exhaust manifold 168 is adapted to receive the fluid flowing through the anodes of the fuel cells 184. The fluid caused to flow through the anodes may be gaseous hydrogen, air, or water.

As illustrated, the fuel cell system 182 includes a first valve 192, also known as a purge valve, in fluid communication with the anode supply manifold 166. The first valve is disposed at the first end 186 of the fuel cell stack, spaced from the anode inlet conduit 198. A second valve 194 is in fluid communication with the anode exhaust manifold 168 and is disposed at the second end 188 of the fuel cell stack. The first valve 192 is adapted to facilitate purging of a fluid from the anode supply manifold 166. The second valve 194 is adapted to facilitate purging of a fluid from the fuel cells 184 and the anode exhaust manifold 168. It is understood that the second valve 194 may be disposed at the first end 186 of the fuel cell stack 110, if desired.

During a filling operation of the fuel cell stack 110, the first valve 192 and the second valve 194 are closed. As shown in FIG. 2, gaseous hydrogen 190 is caused to flow from the hydrogen source 197 and into the anode inlet conduit 198 with no substantial amount of gaseous hydrogen 190 flowing into the anode supply manifold 166. Because the valves 192, 194 are closed, a flow of hydrogen into the anode inlet conduit 198 causes the contents of the anode supply manifold 166, typically air 196, to flow into the active area of the fuel cell stack 110. During a pressure build step, the fluid pressure within the fuel cell stack 110 is increased by continuing to introduce hydrogen into the anode inlet conduit 198. Once a desired pressure in the fuel cell stack 110 is reached, the first valve 192 is opened and the gaseous hydrogen 190 flows into and through the anode supply manifold 166. Since the active areas of the fuel cells 184 in the fuels cell stack 110 are pressurized, the gaseous hydrogen 190 is caused to flow through the anode supply manifold 166 and to the first valve 192, but is not permitted to flow into the active areas of the fuel cells 184. It is understood that an added volume between the hydrogen source 197 and the anode supply manifold 166 provides for a higher final pressure in the active areas of the fuel cells 184. The relationship of the added volume and the final pressure in the active areas of the fuel cells 184 can be expressed as the following equation:

$$P_{final} < P_{initial} * (1 + (V_{inlet}/V_{total}))$$

where, $P_{final}$ is the final anode pressure achieved during the pressure build step; $P_{initial}$ is the anode pressure present prior to the pressure build step; $V_{inlet}$ is the anode volume between the hydrogen source 197 and the anode supply manifold 166; and $V_{total}$ is the anode volume that will experience a rise in pressure. It is understood that the added volume may be an increase in the cross-sectional area of the anode inlet conduit 198 and a third chamber, for example.

It is desirable for the flow rate of the gaseous hydrogen 190 from the hydrogen source 197 through the anode inlet conduit 198 to be substantially the same as the flow rate of the fluid through the first valve 192. The equal flow rate militates against a change in the pressure of the active areas of the fuel cell stack 110 during the manifold purge step. Where the flow rate of the gaseous hydrogen 190 from the hydrogen source 197 through the anode inlet conduit 198 is higher than the flow rate of the fluid through the first valve 192, the air 196 in the active area of the fuel cell stack 110 compresses. The compression allows intrusion of gaseous hydrogen 190 into the active area of the fuel cell stack 110 leading to carbon corrosion. Where the flow rate of the gaseous hydrogen 190 from the hydrogen source 197 through the anode inlet conduit 198 is lower than the flow rate of the fluid through the first valve 192, the air 196 in the active area of the fuel cell stack 110 will decompress. The decompression of the air 196 results in a backflow of the air 197 into the anode supply manifold 166 resulting in an anode supply manifold 166 that is partially or unevenly filled with hydrogen. If the pressure of the fluids in the active area is maintained, hydrogen from the anode supply manifold 166 will not enter the pressurized active area of the fuel cell stack 110, as the anode supply manifold 166 is filled with hydrogen.

Once the gaseous hydrogen 190 has substantially filled the anode supply manifold 166, the first valve 192 is closed. Next, the second valve 194 is opened, and the gaseous hydrogen 190 is continuously supplied to the anode supply manifold 166, thereby causing hydrogen to flow through the active areas of the anode portions of each of the fuel cells 184. As illustrated in FIG. 3, hydrogen is caused to flow through the active area of each fuel cell 184 at substantially the same flow rate, resulting in an even reactant distribution throughout the fuel cell stack 110 prior to a start-up operation. An even reactant distribution results in a substantially uniform voltage between individual fuel cells 184 of the fuel cell stack 110 and militates against carbon corrosion caused by hydrogen deficits in the fuel cells 184, for example, when current is drawn from the fuel cell stack 110. As hydrogen flows through the active areas of the fuel cells 184, air 196 is purged from the fuel cells 184 and the anode exhaust manifold 168, through the second valve 194, and to the exhaust system 199. It is understood that the flow rate of hydrogen through the active areas of the fuel cells may be maximized in order to minimize the time any hydrogen-air fronts are present in the active area of the fuel cell stack 110.

Figure 4:
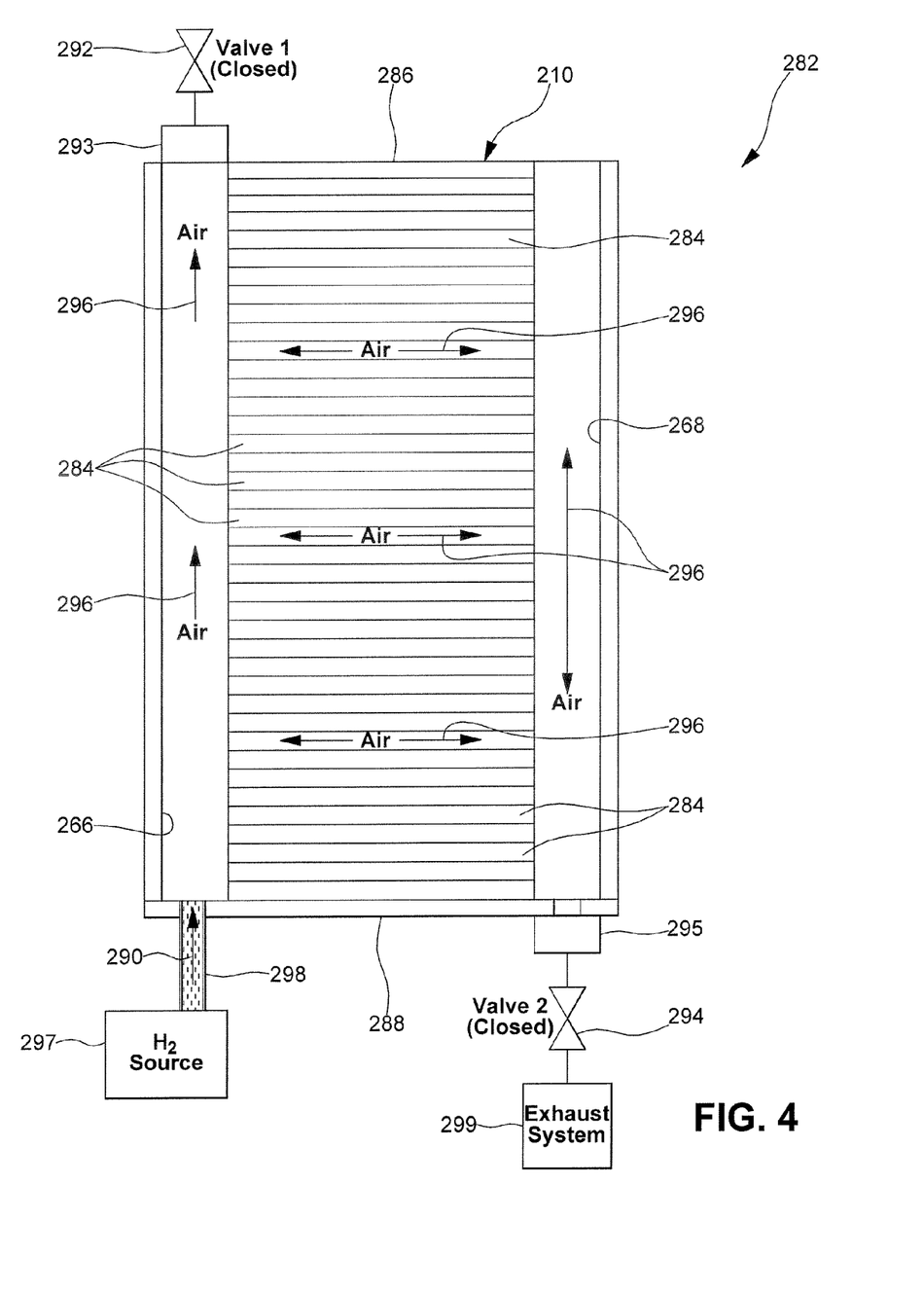
FIG. 4 is a schematic cross-sectional view of a fuel cell stack during a filling operation of an anode supply manifold of the fuel cell stack according to another embodiment of the present invention.
Figure 5:
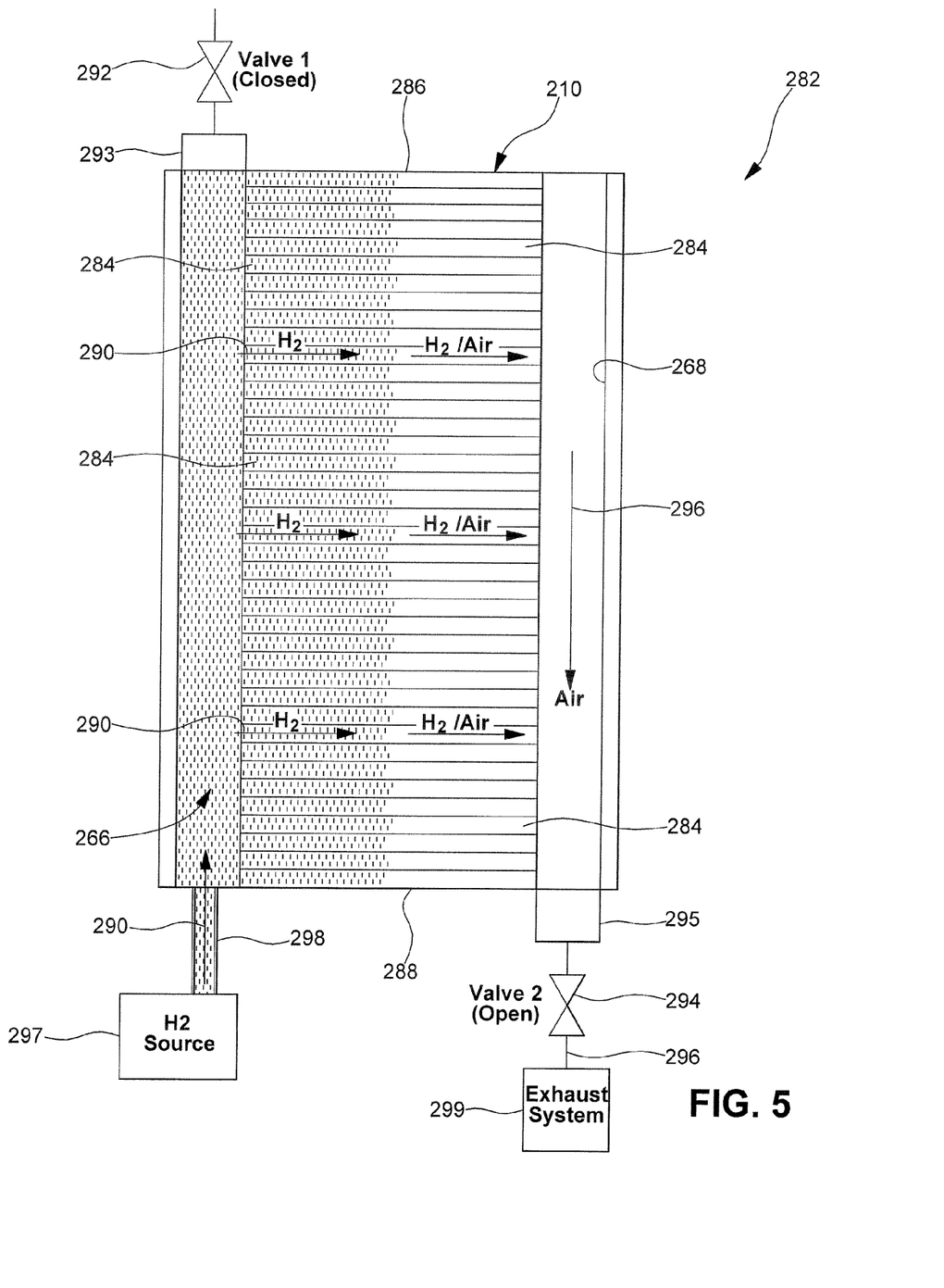
FIG. 5 is a schematic cross-sectional view of the fuel cell stack of FIG. 4 after the anode supply manifold filling operation.

FIGS. 4 and 5 show a fuel cell system 282 according to another embodiment of the invention. The fuel cell system 282 includes a fuel cell stack 210 having a plurality of fuel cells 284. Each of the fuel cells 284 has an anode (not shown) and a cathode (not shown) with an electrolyte membrane (not shown) disposed therebetween. The fuel cell stack 210 further includes a first end 286 and a second end 288. As described herein, the first end 286 is known as the "dry end" and the second end 288 is known as the "wet end."

An anode supply manifold 266 is in communication with the anodes of the fuel cells 284 and provides fluid communication between a source of hydrogen 297 and the fuel cells 284. The anode supply manifold 266 is adapted to receive a flow of gaseous hydrogen 290 through an anode inlet conduit 298 from the source of hydrogen 297. The anode inlet conduit 298 defines a volume between the source of hydrogen 297 and the anode supply manifold 266. It is understood that the anode inlet conduit 198 may have any desired cross-sectional area and may further include an additional volume such as a chamber, for example. An anode exhaust manifold 268 of the fuel cell system 282 provides fluid communication between the anodes of the plurality of fuel cells 284 and an exhaust system 299. The anode exhaust manifold 268 is adapted to receive the fluid flowing through the anodes of the fuel cells 284. The fluid caused to flow through the anodes may be gaseous hydrogen, air, or water.

As illustrated, the fuel cell system 282 includes a first valve 292, a second valve 294, a first chamber 293, and a second chamber 295. The first valve 292, also known as a purge valve, is in fluid communication with the anode supply manifold 266. The first valve is disposed at the first end 286 of the fuel cell stack, spaced from the anode inlet conduit 298. The second valve 294 is in fluid communication with the anode exhaust manifold 268 and is disposed at the second end 288 of the fuel cell stack. The first valve 292 is adapted to facilitate purging of a fluid from the anode supply manifold 266. The second valve 294 is adapted to facilitate purging of a fluid from the fuel cells 284 and the anode exhaust manifold 268. It is understood that the second valve 294 may be disposed at the first end 286 of the fuel cell stack 210, if desired. The first chamber 293 is disposed between the anode supply manifold 266 and the first valve 292. The second chamber 295 is disposed between the anode exhaust manifold 268 and the second valve 294.

During a filling operation of the fuel cell stack 210, the first valve 292 and the second valve 294 are closed. As shown in FIG. 4, gaseous hydrogen 290 is caused to flow from the hydrogen source 297 and into the anode inlet conduit 298 with no substantial amount of gaseous hydrogen 290 flowing into the anode supply manifold 266. Because the valves 292, 294 are closed, a flow of hydrogen into the anode inlet conduit 298 causes the contents of the anode supply manifold 266, typically air 296, to flow into the active area of the fuel cell stack 210. During a pressure build step, the fluid pressure within the fuel cell stack 210 is increased by continuing to introduce hydrogen into the anode Inlet conduit 298. Once a desired pressure in the fuel cell stack 210 is reached, the first valve 292 is opened and the gaseous hydrogen 290 flows into and through the anode supply manifold 266. Since the active areas of the fuel cells 284 in the fuels cell stack 210 are pressurized, the gaseous hydrogen 290 is caused to flow through the anode supply manifold 266 and to the first valve 292, but is not permitted to flow into the active areas of the fuel cells 284. It is understood that an added volume between the hydrogen source 297 and the anode supply manifold 266 provides for a higher final pressure in the active areas of the fuel cells 284. The relationship of the added volume and the final pressure in the active areas of the fuel cells 184 can be expressed as the following equation:

$$P_{final} < P_{initial} * (1 + (V_{inlet}/V_{total}))$$

where, $P_{final}$ is the final anode pressure achieved during the pressure build step; $P_{initial}$ is the anode pressure present prior to the pressure build step; $V_{inlet}$ is the anode volume between the hydrogen source 297 and the anode supply manifold 266; and $V_{total}$ is the anode volume that will experience a rise in pressure. It is understood that the added volume may be an increase in the cross-sectional area of the anode inlet conduit 298 and a third chamber for example. It is understood that the added volume may be an increase in the cross sectional area of the anode inlet conduit 298 and a third chamber, for example.

It is desirable for the flow rate of the gaseous hydrogen 290 from the hydrogen source 297 through the anode inlet conduit 298 to be substantially the same as the flow rate of the fluid through the first valve 292. The equal flow rate militates against a change in the pressure of the active areas of the fuel cell stack 210 during the manifold purge step. Where the flow rate of the gaseous hydrogen 290 from the hydrogen source 297 through the anode inlet conduit 298 is higher than the flow rate of the fluid through the first valve 292, the air 296 in the active area of the fuel cell stack 210 will compress. The compression will allow intrusion of gaseous hydrogen 290 into the active area of the fuel cell stack 210 leading to carbon corrosion. Where the flow rate of the gaseous hydrogen 290 from the hydrogen source 297 through the anode inlet conduit 298 is lower than the flow rate of the fluid through the first valve 292, the air 296 in the active area of the fuel cell stack 210 will decompress. The decompression of the air 296 results in a backflow of the air 297 into the supply manifold 266 resulting in an anode supply manifold 266 that is partially or unevenly filled with hydrogen. If the pressure of the fluids in the active area is maintained, hydrogen from the anode supply manifold 266 will not enter the pressurized active area of the fuel cell stack 210, as the anode supply manifold 266 is filled with hydrogen.

Once the gaseous hydrogen 290 enters the first chamber 293 during the manifold purge step, the first valve is closed. The added volume of the first chamber 293 increases the time between the anode supply manifold 266 being filled with hydrogen and allowing hydrogen to flow though the first valve 292, thereby minimizing the hydrogen purging through the first valve 292. Next, the second valve 294 is opened, and the gaseous hydrogen 290 is continuously supplied to the anode supply manifold 266. The hydrogen is thereby caused to flow through the active areas of the anode portions of each of the fuel cells 284. As illustrated in FIG. 5, hydrogen is caused to flow through the active area of each fuel cell 284 at substantially the same flow rate, resulting in an even reactant distribution throughout the fuel cell stack 210 prior to a start-up operation. An even reactant distribution results in a substantially uniform voltage between individual fuel cells 284 of the fuel cell stack 210 and militates against carbon corrosion caused by hydrogen deficits in the fuel cells 284, for example, when current is drawn from the fuel cell stack 210. As hydrogen flows through the active areas of the fuel cells 284, the air 296 is purged from the fuel cells 284 and the anode exhaust manifold 268, through the second valve 294, and to the exhaust system 299. The added volume of the second chamber 295 increases the time between the active areas of the fuel cells 284 being filled with hydrogen and allowing hydrogen to flow though the second valve 294, thereby minimizing the gaseous hydrogen 290 being emitted through the second valve 294. Specifically, once gaseous hydrogen 290 enters the second chamber 295, the flow rate of the gaseous hydrogen 290 from the hydrogen source 297 may be regulated to minimize the gaseous hydrogen 290 being emitted through the second valve 294. It is understood that the flow rate of hydrogen through the active areas of the fuel cells may be maximized in order to minimize the time any hydrogen-air fronts are present in the active area of the fuel cell stack 210.

The present invention minimizes hydrogen emissions during start-up. The uniform distribution of hydrogen to the anodes minimizes a mixing of hydrogen with air 196, 296 exiting the fuel cell stack 10, 110, 210 through the second valve 194, 294 thus contributing to a lower hydrogen emission upon start-up. A uniform distribution of hydrogen results in a substantially uniform voltage between individual fuel cells 184, 284 of the fuel cell stack 10, 110, 210 and militates against carbon corrosion caused by hydrogen deficits in the fuel cells 184, 284, for example, when current is drawn from the fuel cell stack 10, 110, 210.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for filling a fuel cell anode supply manifold with hydrogen gas during start-up, the method comprising the steps of:
    providing a fuel cell stack having a plurality of fuels cells, the fuel cell stack including an anode supply manifold and an anode exhaust manifold, the anode supply manifold having a fluid disposed therein and in fluid communication with a source of hydrogen gas, wherein an anode inlet conduit defines a volume between the source of hydrogen gas and the anode supply manifold;
    providing a first valve in fluid communication with the anode supply manifold, wherein the first valve is disposed at a first end of the fuel cell stack and spaced from the anode inlet conduit;
    providing a second valve in fluid communication with the anode exhaust manifold;
    supplying hydrogen into the anode inlet conduit with no substantial amount of hydrogen flowing into the anode supply manifold, the first valve and the second valve each in a closed position, thereby pressurizing an active area of the fuel cells of the fuel cell stack to a pre-determined pressure level; and
    opening the first valve to facilitate a purging of at least a portion of the fluid from the anode supply manifold to facilitate a filling of the anode supply manifold with hydrogen, wherein the pressure level of the active areas of the fuel cells militates against a flow of hydrogen through the fuel cells.

2. The method of claim 1 further comprising the step of closing the first valve and opening the second valve to cause the hydrogen to flow into active areas of the fuel cells at a substantially equal rate.

3. The method of claim 2, wherein a flow rate of the hydrogen flowing into the active areas of the fuel cells is maximized, thereby minimizing a time that a hydrogen-air front is present in the active areas of the fuel cells.

4. The method of claim 1, wherein a flow rate of the hydrogen flowing into the anode supply manifold is substantially the same as a flow rate of the fluid through the first valve.

5. The method of claim 1, wherein the pre-determined pressure level of the fuel stack is dependent upon the volume of the anode inlet conduit.

6. The method of claim 1, further comprising the step of providing a chamber between an outlet of the anode supply manifold and the first valve.

7. The method of claim 1, further comprising the step of providing a chamber between an outlet of the anode exhaust manifold and the second valve.

8. A method for filling a fuel cell anode supply manifold with hydrogen gas during start-up, the method comprising the steps of:
- providing a fuel cell stack having a plurality of fuels cells, the fuel cell stack including an anode supply manifold and an anode exhaust manifold, the anode supply manifold having a fluid disposed therein and in fluid communication with a source of hydrogen gas, wherein an anode inlet conduit defines a volume between the source of hydrogen gas and the anode supply manifold;
- providing a first valve in fluid communication with the anode supply manifold, wherein the first valve is disposed at a first end of the fuel cell stack and spaced from the anode inlet conduit;
- providing a second valve in fluid communication with the anode exhaust manifold;
- providing a chamber between an outlet of the anode supply manifold and the first valve;
- providing a chamber between an outlet of the anode exhaust manifold and the second valve;
- supplying hydrogen into the anode inlet conduit with no substantial amount of hydrogen flowing into the anode supply manifold, the first valve and the second valve each in a closed position, thereby pressurizing the fuel cell stack to a desired pressure; and
- opening the first valve to facilitate a purging of at least a portion of the fluid from the anode supply manifold to facilitate a filling of the anode supply manifold with hydrogen.

9. The method of claim 8, wherein the desired pressure of the fuel stack is dependent upon the volume of the anode inlet conduit.

10. The method of claim 8, wherein a flow rate of the hydrogen flowing into the anode supply manifold is substantially the same as a flow rate of the fluid through the first valve.

11. The method of claim 8 further comprising the step of closing the first valve and opening the second valve to cause the hydrogen to flow into active areas of the fuel cells at a substantially equal rate.

12. The method of claim 11, wherein the first valve is closed when hydrogen enters the first chamber.

13. The method of claim 11, wherein a flow rate of the hydrogen flowing into the active areas of the fuel cells is maximized, thereby minimizing a time that a hydrogen-air front is present in the active areas of the fuel cells.

14. The method of claim 11, wherein a flow rate of the hydrogen flowing into the anode supply manifold is regulated as hydrogen enters the second chamber.

15. The method of claim 8, wherein the second valve is closed when hydrogen enters the second chamber.

* * * * *